United States Patent [19]

Schoenfelder

[11] 4,241,782
[45] Dec. 30, 1980

[54] HEAT STORAGE SYSTEM ADAPTED FOR INCONGRUENTLY MELTING HEAT STORAGE MATERIALS AND CONGRUENTLY MELTING HEAT STORAGE MATERIALS

[76] Inventor: James L. Schoenfelder, 415 - 5th St., Coralville, Iowa 52241

[21] Appl. No.: 965,028

[22] Filed: Nov. 30, 1978

[51] Int. Cl.³ ............................................. F28D 17/00
[52] U.S. Cl. ..................... 165/10; 126/400; 126/436; 165/104 S; 219/378; 219/530; 252/70
[58] Field of Search ......... 165/104 S, 49, 53, DIG. 8, 165/10; 126/400, 436; 219/530, 378

[56] References Cited

U.S. PATENT DOCUMENTS

| | | | |
|---|---|---|---|
| 3,224,501 | 12/1965 | Burdick et al. | 165/DIG. 8 |
| 3,356,828 | 12/1967 | Furness | 219/530 X |
| 3,683,152 | 8/1972 | Laing | 165/104 S X |

FOREIGN PATENT DOCUMENTS

| | | | |
|---|---|---|---|
| 1928694 | 12/1969 | Fed. Rep. of Germany | 165/104 S |
| 2506818 | 9/1976 | Fed. Rep. of Germany | 219/378 |

OTHER PUBLICATIONS

Johnson, T. E., *Lightweight Thermal Storage for Solar Heated Buildings,* Solar Energy, vol. 19, pp. 669–675, 1977.

Primary Examiner—Albert W. Davis
Attorney, Agent, or Firm—Zarley, McKee, Thomte, Voorhees & Sease

[57] ABSTRACT

A heat storage article adapted for prevention of stratification of incongruently melting heat storage materials, such as eutectic salts, and adapted for use with congruently melting heat storage materials, such as paraffins. The article is comprised of a concrete stone composition, a certain portion of which is comprised of metallic heat transfer materials in order to increase heat transfer through the concrete structure. The concrete structure has an internal cavity which is filled with either the eutectic salt material or the paraffin material.

8 Claims, 3 Drawing Figures

HEAT STORAGE SYSTEM ADAPTED FOR INCONGRUENTLY MELTING HEAT STORAGE MATERIALS AND CONGRUENTLY MELTING HEAT STORAGE MATERIALS

BACKGROUND OF THE INVENTION

In recent times, much research effort has been done on solar heat collecting systems. This is primarily so because of the existing fact of a shortage of fossil fuels. Typical solar heat collecting systems comprise a solar collecting panel having an exteriorly exposed sunlight transmitting panel and at least one interiorally disposed sunlight transmitting panel, a solar collecting plate spaced apart from and behind the sunlight transmitting panels and a heat absorption fluid passing behind the collector plate to provide heat exchange with the collector plate itself. In actual operation, the sunlight passes through the sunlight transmitting panels and hits the collector plate. The collector plate converts the solar energy into heat energy; and, the heat absorption fluid which usually passes over one of the surfaces of the collector plate, provides heat exchange with the thermally warmed collector plate. Thereafter, the now heated absorption fluid is typically conveyed away to a remote place within the building structure for storage until it is subsequently utilized to warm the interior of the building.

The collector plates, utilized to convert solar energy to heat energy, are well known and are usually comprised of any suitable metal or like material of high solar absorptivity and are typically painted a dark highly absorptive color such as flat black. Metal from which satisfactory collector plates can be made are copper, aluminum, steel and galvanized iron. Aluminum is perhaps the most commonly used collector.

Heat absorption fluids which pass over the collector plate to provide heat exchange therewith are also known. Typical examples of heat absorption fluids utilized in solar heating systems are water, air, ethylene glycol, propylene glycol and other heat exchange fluids.

The heat produced during the light of the day must be stored so that it can be utilized to provide heating during the night and at times when the sun is not shining. This invention is concerned with an efficient heat storage system.

Many heat storage materials utilized to store heat energy for solar heating systems are phase change materials. That is, the heat storage material undergoes phase changes, including changes from solid to liquid form and changes from one crystalline form to another, during heat exchange as the heat storage material gains and loses heat. A typical example of a commonly utilized heat storage material which is a phase change material is Glauber's salt.

Normally one would not be concerned with whether or not a heat storage material undergoes phase changes during heat exchange. However, it has been found that many of the more efficient heat storage materials such as Glauber's salt, which have extremely desirable heat storage characteristics, also possess some unique problems. They are incongruently melting materials. During the fluctuations in temperature involved in the heat exchange between the storage material and the heat absorption fluid, materials such as Glauber's salt undergo stratification. As a result, they form layers of crusted material. This stratification may reduce the heat storage capacity of the material such as Glauber's salt, by more than 50% in a relatively few cycles. Thus, many heat storage materials having extremely desirable heat storage characteristics cannot be utilized successfully because of their inherent stratification problems.

Sodium sulfate decahydrate, commonly known as Glauber's salt, is one example among a class of incongruently melting salts generally referred to as eutectic salts. Others include those listed in the table below:

TABLE I

| Storage Medium | EUTECTIC SALTS | | | |
|---|---|---|---|---|
| | Melting Temp °F. | Density lb/ft$^3$ | Heat of Fusion | |
| | | | Btu/lb | Btu/ft$^3$ |
| $Na_3PO_4 \cdot 12H_2O$ | 150 | 89 | 82 | 7,300 |
| $NaOH \cdot H_2O$ | 148 | 105 | 117 | 12,200 |
| $NaC_2H_3O_2 \cdot 3H_2O$ | 136 | 81 | 114 | 9,200 |
| $NA_2S_2O_3 \cdot 5H_2O$ | 119 | 103 | 90 | 9,300 |
| $Ca(NO_3)_2 \cdot 4H_2O$ | 117 | 116 | 66 | 7,650 |
| $FeCl_3 \cdot 6H_2O$ | 97 | 101 | 96 | 9,700 |
| $Na_2CO_3 \cdot 12H_2O$ | 97 | 95 | 114 | 10,800 |
| $Na_2CO_3 \cdot 10H_2O$ | 93 | 90 | 108 | 9,750 |
| $Na_2SO_4 10H_2O$ | 89 | 91 | 108 | 9,850 |

As previously mentioned during the phase change from solid to liquid, these eutectic salts, and particularly Glauber's salt, are highly useful since the phase change involves a tremendous amount of heat which is either absorbed or rejected during phase change. This heat storage capacity is called "latent heat".

Again, as heretofore mentioned, incongruently melting eutectic salts exhibit a detrimental characteristic called stratification which results in a loss of latent heat storage capacity. For example, with sodium sulfate decahydrate, Glauber's salt, at 90.3° F. the solid crystals melt and change to a saturated solution of 85% sodium sulfate in water and 15% anhydrous sodium sulfate. The anhydrous salt is more dense than the solution; consequently the white granular anhydrous salt settles to the bottom of the container. Increasing the temperature of the solution does not increase solution solubility.

Upon continued cycling, three distinct layers can be identified within the container. The bottom layer will be anhydrous sodium sulfate unable to mix with the water, the next layer will be the decahydrate crystals and the top layer will be free water unable to mix with the bottom anhydrous layer.

Other heat storage materials which involve heat storage capacity because of latent heat of fusion during phase change include organic paraffin materials. Such paraffins are congruently melting compounds which do not exhibit stratification and super cooling properties. They do, however, self insulate upon crystallization and are flammable. When liquid paraffins begin to solidify they to do so first at the edges which are exposed to contact with the container in which they rest. Crystalline structure of the solid paraffins at or near the outer edges of the mass of material is such that it effectively insulates the liquid paraffin. In other words, it reduces the heat flow rate from the liquid paraffin to the walls of the container through which heat is transferred for use to condition space. This characteristic reduces the effectiveness and usefulness of the heat stored in the center of a paraffin mass. It has now been found that this problem can be solved by molding a heat conductive transfer material, such as steel wool directly within the paraffin mass of material. The metal fibers are excellent heat conductors which conduct heat effectively both into and out of the center mass of paraffin. Thus their inherent transfer limitations are overcome.

Accordingly, one object of this invention is to provide a heat transfer article which can be used with congruently melting compounds such as paraffins in order to make the heat transfer far more effective for such paraffins.

Yet another object of this invention is to provide a heat storage material which can be effectively used with incongruently melting heat storage materials, such as eutectic salts like Glauber's Salt, which will effectively prevent stratification and decreasing efficiency of the heat storage material.

Yet another object of this invention is to provide a heat storage container made from essentially commonly available building concrete which has its heat tranfer characteristics augmented significantly by molding directly into the concrete material a certain portion of an effective heat transfer metal in the form of filings, flakes, chips or the like.

Yet another object of this invention is to provide a heat storage container which is essentially a concrete block structure which can be used for passive solar heating via a solar heat storage system or for direct solar radiation by exposure directly to solar radiation for absorption directly into the material. The concrete block building structure of this invention may be used to form wall structures if desired. They may be used for flooring, or any other conventional use for which building blocks may be used.

DETAILED DESCRIPTION OF THE INVENTION

As heretofore mentioned, Glauber's salt and other phase change salt materials which are useful as latent heat storage materials are classified as incongruently melting substances. This means that as the substance melts or solidifies, it does so by going through intermediate stages. Several melting and freezing cycles separate these intermediate stages, as heretofore described. Thus, after several cycles Glauber's salt itself will actually separate into an anhydrous layer, a hydrated layer and a water layer.

While the description presented herein is primarily presented in terms of Glauber's salt, it is to be understood that other salts which are desirable heat storage materials also possess the same problems of Glauber's salt and such materials are equally suitable for this invention. Since such materials which can be substituted effectively for Glauber's salt have previously been presented in Table I, a listing will not be repeated herein.

It has been found that a heat storage material contained within the internal cavity of a container element which is comprised of a specially prepared concrete to provide thermally conductive building blocks will not stratify during use as a heat storage unit in a solar heating system providing the internal cavity is completely filled with the heat storage and a matrix of an inorganic suspension material.

For use with congruently melting materials such as paraffins, employment of a thermally conductive metallic fibrous mesh, such as steel wool, within the paraffin itself substantially augments their heat transfer characteristics.

Congruently melting paraffins which may be useful in this invention are well known organic paraffin materials. They are the type of paraffin waxes which are normally solid at room temperature and which are often used in the making of candles, paper coating, protective sealants for food products, lubricants, the making of crayons and the like. Such paraffin waxes are normally white, translucent, tasteless, odorless, solid materials consisting of a mixture of solid hydrocarbons of high molecular weight, for example, $C_{16}$ or greater with $C_{36}H_{74}$ being such a typical example. $C_{16}$ paraffin is an example which may be used in this invention. Very commonly the paraffin waxes which are used are in fact a mixture of high melting point paraffin materials. Such an example is Sonoco P-116 which has a heat of fusion of 90 BTU's per pound. As those skilled in the art know, virtually any paraffin wax, or mixtures of paraffins to form a composite wax which will undergo phase change temperatures reached in solar storage systems may be used.

Figure 1:
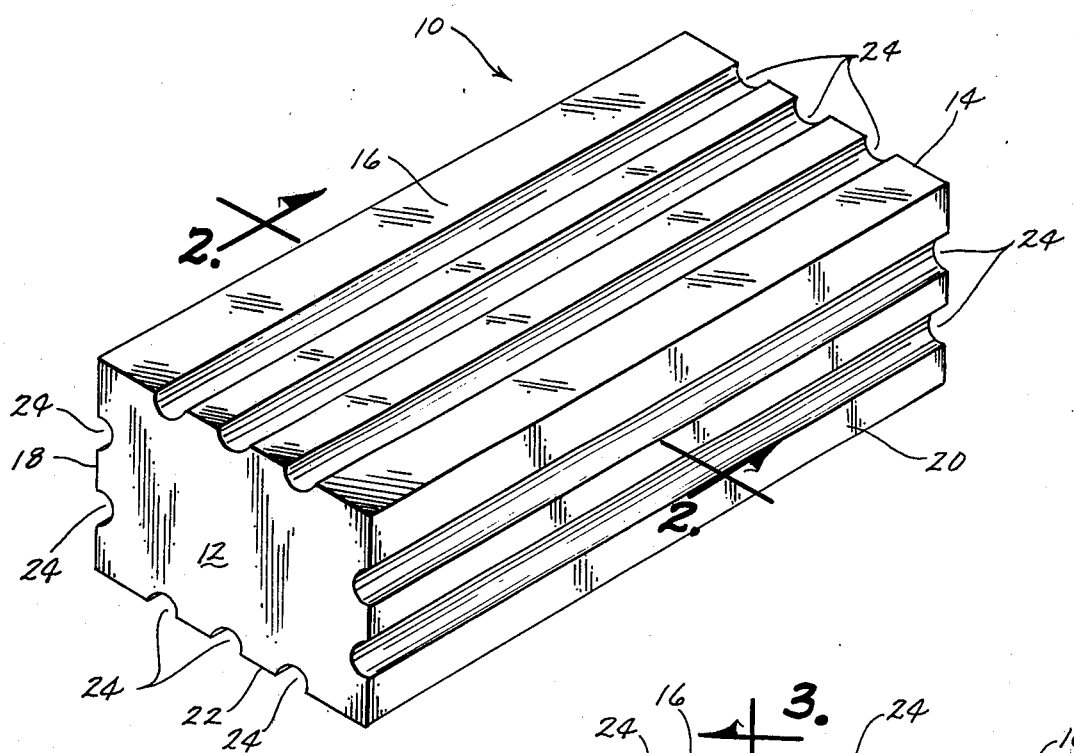
FIG. 1 is a perspective view of the heat storage block of this invention.

FIG. 1 shows a perspective view of a heat storage block 10 of this invention. The block 10 is rectangular in cross-section (see FIG. 2), with its top and bottom ends 12 and 14 being flat planar surfaces.

Side surfaces 16, 18, 20 and 22 each have a plurality of longitudinally extending grooves 24. Longitudinal grooves 24 are important in that they provide air passages when the transfer blocks 10 are stacked together. Further, they provide grouting channels for stacked bonding; additionally, they provide increased surface area for heat transfer.

The concrete from which block 10 is made is an important part of this invention. Conventional concrete blocks in and of themselves are not an ideal heat conductor. For that reason, a special formulation of concrete is used to form the heat storage blocks 10 of this invention. Along with the conventional fine sand aggregate and gravel aggregate, and of course the masonry concrete, a metal powder, metal filings, and/or metal flakes are used in the aggregate composition for forming block 10. The metallic material, which is preferably substantially homogeneously mixed with the concrete, functions as a heat transfer material and increases substantially the aggregate heat transfer effectiveness of the blocks. The amount of heat transfer metallic material may be within the range of from about 5% by weight to about 20% by weight of the fine sand aggregate portion of the block composition, but is preferably within the range of from about 8% by weight to about 15% by weight of the fine sand aggregate portion. Very satisfactory results have been obtained with the most preferred composition being precisely at about 10% by weight of the fine sand aggregate portion. There is no precise criticality in the metallic material which may be employed, but typically such materials can be steel shavings and/or filings, obtained from blacksmithing and/or foundry shops or the like. Metals other than steel may be employed since they do have effective heat transfer enhancement characteristics. However, for economic reasons, other more expensive metals are not desirable.

The concrete portion of the blocks 10 provide the structural integrity for the heat storage units. Individual blocks 10 may be grouted together as ordinary masonry units to form a load bearing wall. They may be stacked to form a self-supporting storage mass. They may be laid side by side to form a concrete floor or the like.

Figure 2:
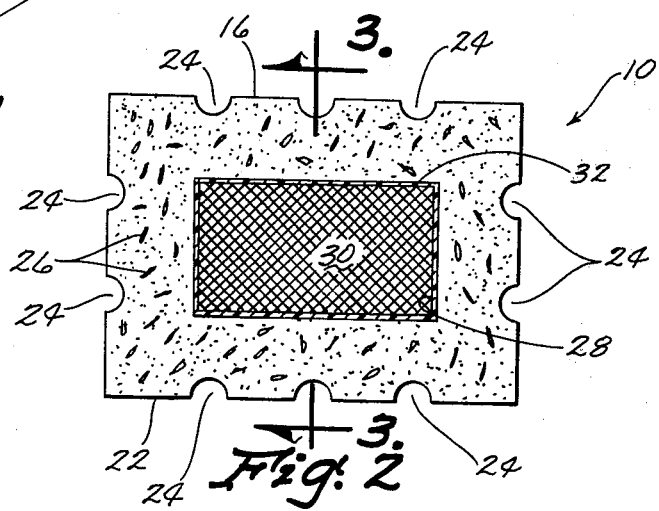
FIG. 2 is a cross-sectional view along line 2—2 of FIG. 1 showing the internal structure of the blocks of this invention.
Figure 3:
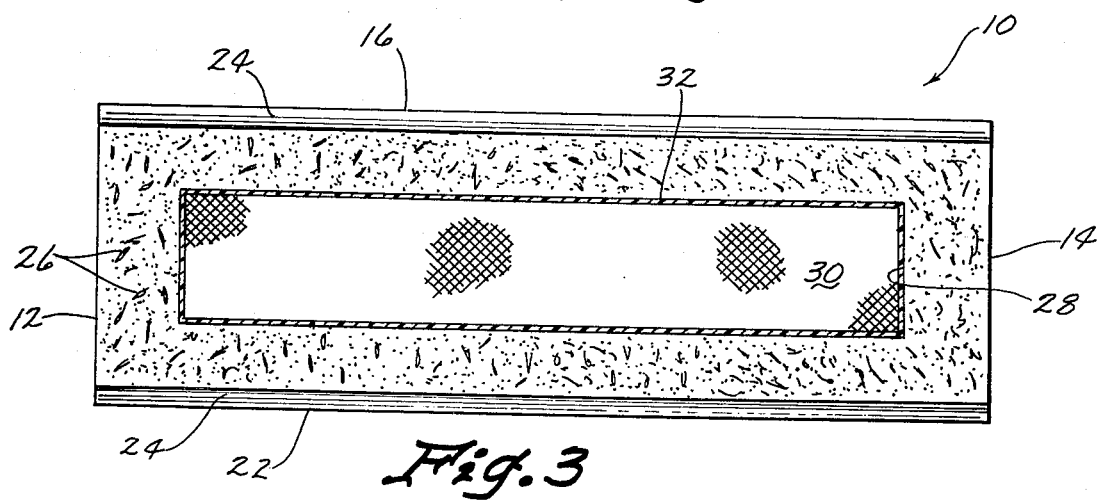
FIG. 3 is a sectional view of the block along line 3—3 of FIG. 2.

Looking now at FIG. 2, the metallic transfer chips or the like are representatively shown at 26. The internal portion of the block contains an internal cavity 28 which is filled with the phase change heat storage material 30. If desired, the internal wall portion of cavity 28 may be effectively lined with a thin film plastic or metal foil membrane 32 in order to prevent the fluid from evaporation during use of the block 10. In making of the block, the block is formed around the heat transfer material 30 which itself is within liner 32.

The size of the heat storage block 10 has been found of some importance. Very satisfactory results are obtained with blocks which are 12 inches long, 4 inches deep and 5½ inches in width with one-quarter inch depth grooves 24. Such blocks have been found to be of satisfactory size in that their weight and dimensions are reasonable for handling and assembly by a single work person. Such blocks generate optimum surface area for the volume of phase change material stored inside. Also, such blocks are of sufficient size to maintain structural integrity.

In employing blocks 10 of this invention as heat storage units, at times it has been found desirable to employ layers of the blocks with some of the layers employing distinctly separate eutectic salts. For example, when sodium sulfate decahydrate, paraffin phase change material and sodium thiosulfate are used in separate stones to produce latent heat storage, phase change temperatures are respectively 89° F., 116° F. and 120° F. In such instances, the highest temperature phase change material may be used on the top of a vertical storage room, the mid-range phase change material in the middle and the lowest phase change material at the bottom. In this manner, the natural heat stratification of the storage room is used effectively by the phase change units.

The blocks 10 may be stacked on edge, on end or lying flat. The blocks may be placed in any configuration to form any shape storage room desired. Air flow is determined by the direction of the grooves on all sides of each block. Air flow may be vertical or horizontal. The air flow through groove 24 effectively enhances heat transfer. If desired, blocks 10 of only one phase change temperature may be used in a storage room to develop a single temperature phase change storage.

An additional problem for congruently melting phase change materials such as paraffins has been overcome. These materials are highly flammable. Therefore, they have not been used effectively primarily for this reason, as well as their slowness for heat transfer. The augmented heat transfer provided by the concrete blocks, and the incorporation of metal transfer agents directly into the paraffin overcome their heat transfer ineffectiveness. The flammability problem is overcome since paraffins are completely encased in concrete, decreasing the fire hazard significantly.

In summary, a unique and useful heat storage system has been provided. The blocks 10 of the heat storage system can be used as building blocks if desired. Incongruently melting phase change materials can be used with stratification being prevented by substantially completely filling the cavity with the material in combination with a non-biodegradable filler. Incorporation of non-biodegradable filler materials such as fiberglass may be accomplished, as shown in my co-pending application Ser. No. 836,486 filed Sept. 26, 1977, which is incorporated herein by reference. Congruently melting phase change materials with heat transfer augmentation provided by metal fibers folded into the paraffins may be employed. The concrete blocks 10 are composed in part of a metallic aggregate in order to increase their heat transfer effectiveness. Longitudinally extending grooves 24 of the block provide for air transfer passages and increased surface area. It can therefore be seen that the invention accomplishes at least all of its stated objects.

What is claimed is:

1. A heat storage article comprised of a concrete block, the composition of which comprises conventional masonry concrete and from about 5% to about 20% by weight of the fine aggregate portion of said block of a heat transfer augmenting material mixed with said concrete, said block having an internal cavity which is substantially completely filled with a eutectic salt heat storage material, mixed with a non-biodegradable bulky material and the mixture being surrounded by a liner material.

2. The heat storage block of claim 1 wherein said block has a plurality of longitudinally extending grooves on its exteriorly exposed surfaces.

3. The heat storage blocks of claim 2 wherein said metallic heat transfer material comprises from about 8% to about 15% by weight of the fine aggregate portion of the block composition.

4. The heat storage blocks of claim 3 wherein said metallic heat transfer material comprises about 10% by weight of the fine aggregate portion of said block composition.

5. The heat storage blocks of claim 1 wherein said metallic heat transfer augmenting material is substantially homogeneously mixed throughout said concrete block.

6. The heat storage blocks of claim 1 wherein said bulky material is fiberglass.

7. The heat storage blocks of claim 1 wherein said heat storage material is a congruently melting paraffin.

8. The heat storage blocks of claim 7 wherein said paraffin is admixed with thermally conductive fibrous mesh material.

* * * * *